United States Patent
Bak

(10) Patent No.: US 9,219,263 B2
(45) Date of Patent: *Dec. 22, 2015

(54) CENTER PIN FOR SECONDARY BATTERY AND SECONDARY BATTERY HAVING THE SAME

(71) Applicant: SAMSUNG SDI CO., LTD., Yongin-si, Gyeonggi-do (KR)

(72) Inventor: Hyo-Rim Bak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 60 days.

This patent is subject to a terminal disclaimer.

(21) Appl. No.: 14/029,712

(22) Filed: Sep. 17, 2013

(65) Prior Publication Data

US 2014/0017548 A1    Jan. 16, 2014

Related U.S. Application Data

(62) Division of application No. 12/410,805, filed on Mar. 25, 2009, now Pat. No. 8,563,156.

(30) Foreign Application Priority Data

Mar. 25, 2008 (KR) .................... 10-2008-0027325

(51) Int. Cl.
*H01M 2/12* (2006.01)
*H01M 10/04* (2006.01)
(Continued)

(52) U.S. Cl.
CPC ........ *H01M 2/1264* (2013.01); *H01M 10/0431* (2013.01); *H01M 10/0587* (2013.01); *H01M 2/1646* (2013.01)

(58) Field of Classification Search
CPC ... H01M 2/16; H01M 2/1646; H01M 2/1264; H01M 10/0431; H01M 10/0587
USPC .............. 429/74, 94, 129, 161, 174, 186, 211
See application file for complete search history.

(56) References Cited

U.S. PATENT DOCUMENTS 5,736,270 A    4/1998    Suzuki et al.
6,335,114 B1   1/2002    Ueshima et al.
(Continued)

FOREIGN PATENT DOCUMENTS

CN    1639887 A      7/2005
JP    11-204130      7/1999
(Continued)

OTHER PUBLICATIONS

SIPO Office action dated Nov. 22, 2010, for corresponding Chinese Patent application 200910130128.9, with English translation.
(Continued)

*Primary Examiner* — Yogendra Gupta
*Assistant Examiner* — Emmanuel S Luk
(74) *Attorney, Agent, or Firm* — Christie, Parker & Hale, LLP

(57) ABSTRACT

A center pin for a secondary battery and a secondary battery having the same, which optimizes a void volume of the secondary battery. The center pin is inserted into an electrode assembly of the secondary battery. The center pin has a longitudinal hole and includes a sealing member to seal a portion of the hole. The sealing member can include walls disposed within the center pin, to seal the portion of the hole. The sealing member can include a second center pin, which is inserted into the hole, to seal the portion of the hole.

13 Claims, 4 Drawing Sheets

(51) Int. Cl.
*H01M 10/0587* (2010.01)
*H01M 2/16* (2006.01)

(56) References Cited

U.S. PATENT DOCUMENTS

| | | | |
|---|---|---|---|
| 7,879,484 B2 | 2/2011 | Hyung et al. | |
| 7,935,440 B2 | 5/2011 | Shin | |
| 7,998,608 B2 | 8/2011 | Mori et al. | |
| 8,053,102 B2 | 11/2011 | Hennige et al. | |
| 8,367,243 B2 | 2/2013 | Ishizu et al. | |
| 2003/0215700 A1 | 11/2003 | Hosoda et al. | |
| 2005/0084761 A1 | 4/2005 | Hennige et al. | |
| 2006/0093903 A1 | 5/2006 | Hong et al. | |
| 2006/0263676 A1 | 11/2006 | Chang et al. | |
| 2006/0263693 A1* | 11/2006 | Kim et al. | 429/251 |
| 2006/0275666 A1 | 12/2006 | Chang et al. | |
| 2007/0020525 A1* | 1/2007 | Kim et al. | 429/251 |
| 2007/0048602 A1* | 3/2007 | Kim | 429/144 |
| 2008/0226981 A1 | 9/2008 | Yoon | |
| 2009/0092900 A1* | 4/2009 | Obana et al. | 429/223 |
| 2011/0008672 A1 | 1/2011 | Kim | |
| 2011/0064995 A1 | 3/2011 | Kim | |
| 2011/0076549 A1 | 3/2011 | Kim | |
| 2011/0091748 A1 | 4/2011 | Hyung et al. | |

FOREIGN PATENT DOCUMENTS

| | | |
|---|---|---|
| JP | 2001-126769 | 5/2001 |
| JP | 2005-011817 | 1/2005 |
| JP | 2006-120606 | 5/2006 |
| JP | 2006-128104 | 5/2006 |
| JP | 2006-286624 | 10/2006 |
| KR | 10-2005-0118847 | 12/2005 |
| KR | 2006-102251 | 9/2006 |
| KR | 2007-6244 | 1/2007 |
| KR | 2007-34222 | 3/2007 |
| KR | 2007-47961 | 5/2007 |
| KR | 2007-71237 | 7/2007 |
| KR | 2007-71238 | 7/2007 |
| KR | 10-2007-0097855 | 10/2007 |
| WO | WO 03/073534 A2 | 9/2003 |
| WO | WO 2008/050981 A1 | 5/2008 |

OTHER PUBLICATIONS

SIPO Office action dated Nov. 4, 2011, for corresponding Chinese Patent application 200910130128.9, with English translation, (8 pages).
SIPO Office action dated May 30, 2012, for corresponding Chinese Patent application 200910130128.9, with English translation, (13 pages).
SIPO Office action dated Dec. 20, 2012, for corresponding Chinese Patent application 200910130128.9, with English translation, (16 pages).
Japanese Office action dated Oct. 25, 2011, for corresponding Japanese Patent application 2008-195847, (5 pages).
Japanese Office action dated Aug. 14, 2012, for corresponding Japanese Patent application 2008-195847, (3 pages).
Patent Abstracts of Japan, and English machine translation of Japanese Publication 11-204130 listed above, 32 pages.
Patent Abstracts of Japan, and English machine translation of Japanese Publication 2001-126769 listed above, 29 pages.
European Search Report dated Sep. 8, 2011, for corresponding European Patent application 09156100.1, (5 pages).
European Summons to Appear, dated Sep. 7, 2012, for corresponding European Patent application 09156100.1, (5 pages).
Korean Office Action issued on Nov. 30, 2009 in corresponding Korean Patent Application No. 10-2008-0027325.
European Search Report issued on Jul. 23, 2009, in the corresponding European Patent Application No. 09156100.1.

\* cited by examiner

CENTER PIN FOR SECONDARY BATTERY AND SECONDARY BATTERY HAVING THE SAME

CROSS-REFERENCE TO RELATED APPLICATION

This application is a divisional of U.S. patent application Ser. No. 12/410,805, filed Mar. 25, 2009, which claims priority to and the benefit of Korean Patent Application No. 10-2008-0027325, filed Mar. 25, 2008, the entire content of both of which is incorporated herein by reference.

BACKGROUND OF THE INVENTION

1. Field of the Invention

Aspects of the present invention relate to a center pin for a secondary battery and a secondary battery having the same, and more particularly, to a center pin for a secondary battery, which can optimize the void volume of the secondary battery.

2. Description of the Related Art

In recent times, various handheld, electronic devices, such as cellular phones, notebook computers, camcorders, and so on, have been developed and manufactured. Handheld electronic devices generally include a secondary battery for portable operations. Exemplary secondary batteries include nickel-cadmium (Ni—Cd) batteries, nickel-metal hydride (Ni-MH) batteries, and lithium (Li) batteries.

Lithium secondary batteries are widely employed in portable electronic devices, because they have three times the operating voltage and a higher energy density per unit weight than the Ni—Cd batteries and the Ni-MH batteries. A lithium secondary battery may be classified as a lithium ion battery, which uses a liquid electrolyte, or as a lithium polymer battery, which uses a polymer electrolyte. A secondary battery may also be classified as a rectangular, cylindrical, or pouch-type, according to the shape thereof.

A cylindrical secondary battery generally includes: a cylindrical, wound, electrode assembly; a center pin disposed in the electrode assembly; a can to house the electrode assembly; an electrolyte to transfer lithium ions in the electrode assembly; and a cap assembly to seal the can. The electrode assembly includes: a positive electrode plate having a positive electrode collector, to which a positive electrode active material is applied; a positive tab that extends from one side of the positive electrode collector; a negative electrode plate having a negative electrode collector to which a negative electrode active material is applied; a negative electrode tab that extends from one side of the negative electrode collector; and a separator disposed between the positive electrode plate and the negative electrode plate.

Lithium ions, generated by electrochemical reactions in the electrode assembly, are transferred through the electrolyte during charging or discharging of the secondary battery. The electrolyte may be a non-aqueous organic electrolyte, which is a mixture of a lithium salt and a high-purity organic solvent, or may be a polymer electrolyte.

The cap assembly includes a safety vent that is deformed, or broken, by gas generated during an abnormal operation of the electrode assembly. The safety vent prevents the cylindrical secondary battery from combusting or exploding, due to damage to overcharging, over discharging, or external impacts to the secondary battery.

The center pin prevents the deformation of the electrode assembly, during the charging or discharging, and provides a passage for the release of the gas. Thus, the gas can be channeled to the safety vent, which can then deform or break, such that the secondary battery does not combust or explode.

The secondary battery has a certain amount of empty space (void volume). However, as the center pin includes a hole formed in a longitudinal direction in the center pin in a direction of the cap assembly, so that a void volume of the secondary battery is increased, the insulating and charging characteristics of the secondary battery may be degraded, and the deformation or breakage of the safety vent may be delayed.

Moreover, when the separator of the electrode assembly includes a ceramic porous layer to enhance the characteristics of the secondary battery, the void volume in the secondary battery becomes much larger. Thus, the deformation or breakage of the safety vent is delayed, and the secondary battery can combust or explode.

However, if the center pin does not have a hole therein, or all volume of the hole is sealed by a sealing member, the void volume of the secondary battery is greatly reduced by the sealed volume of the hole, and thus, the high-temperature storage characteristics of the secondary battery can be degraded.

SUMMARY OF THE INVENTION

Aspects of the present invention provide a center pin for a secondary battery, and a secondary battery including the same. The void volume of the secondary battery is optimized, by the insertion of a second center pin into a hole formed in the first center pin.

According to an exemplary embodiment of the present invention, a center pin assembly for a secondary battery, comprising a center pin having a hole formed in a longitudinal direction, and a sealing member disposed in the center pin, to seal a portion of the hole.

According to another exemplary embodiment of the present invention, a secondary battery includes: an electrode assembly having a positive electrode plate, a negative electrode plate, and a separator disposed therebetween; a center pin disposed in the electrode assembly, having a longitudinal hole; a sealing member disposed in the hole, to seal a portion of the hole; a can to house the electrode assembly; and a cap assembly to seal an opening of the can.

According to still another exemplary embodiment of the present invention, a center pin assembly for a secondary battery includes a first center pin having a longitudinal hole and a second center pin disposed in the first center pin, to adjust the inner space of the hole.

According to yet anther exemplary embodiment of the present invention, a secondary battery includes: an electrode assembly having a positive electrode plate, a negative electrode plate, and a separator disposed therebetween; a first center pin disposed in the electrode assembly, having a longitudinal hole; a second center pin disposed in the hole, to optimize the void volume of the secondary battery; a can to house the electrode assembly; and a cap assembly to seal an opening of the can.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1:
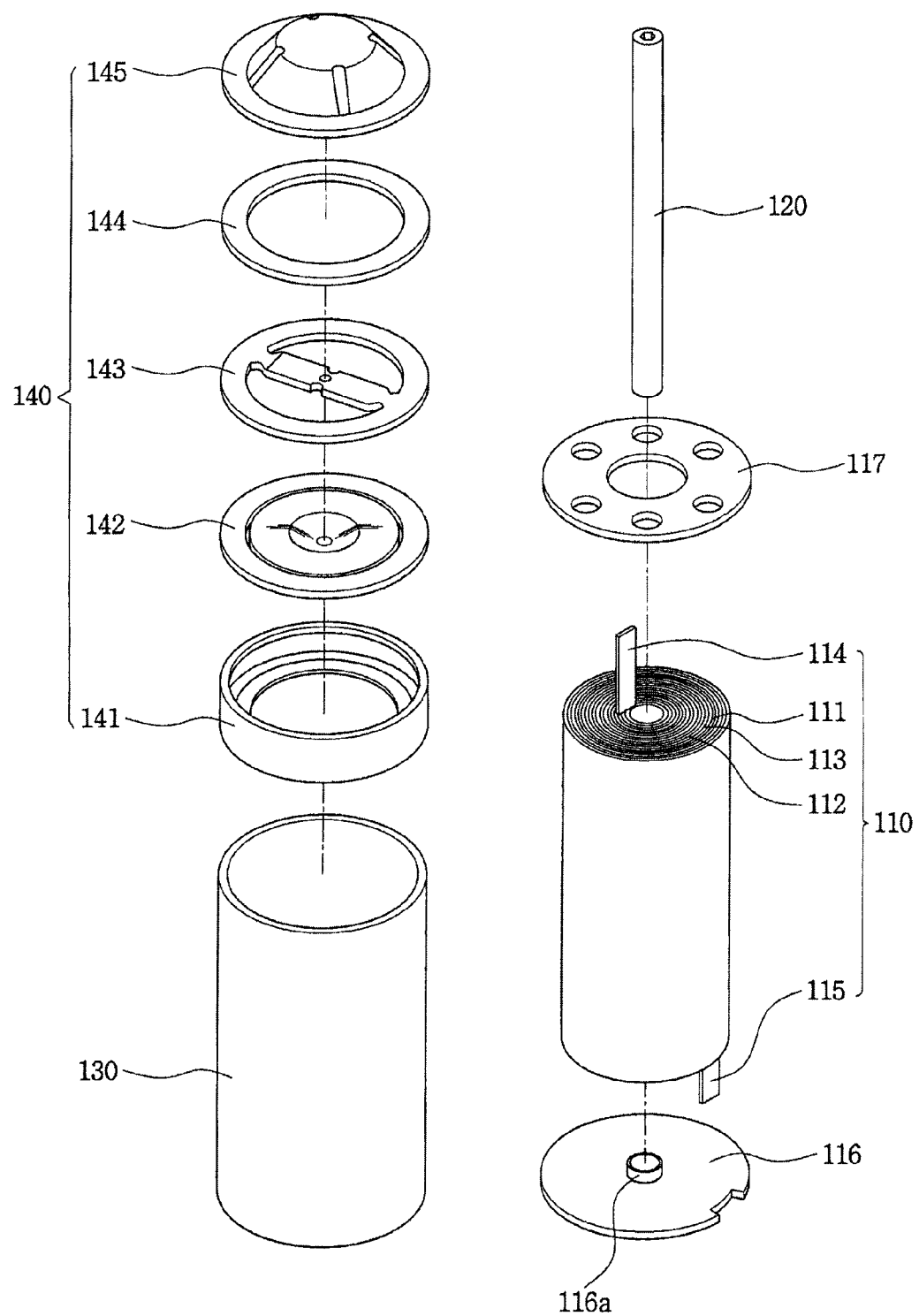
FIG. 1 is an exploded perspective view of a secondary battery, according to a first exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of present invention, by referring to the figures.

Figure 2:
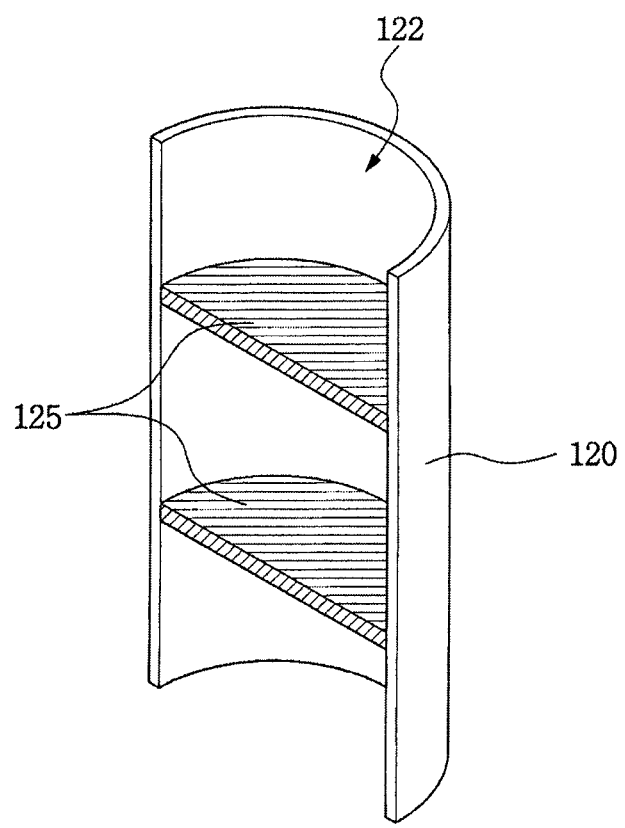
FIG. 2 is a perspective view of a center pin of the secondary battery, according to the first exemplary embodiment of the present invention.

FIG. 1 is an exploded perspective view of a secondary battery 100, according to a first exemplary embodiment, and FIG. 2 is a perspective view of a center pin 120 of the secondary battery 100. Referring to FIGS. 1 and 2, the secondary battery 100 includes: an electrode assembly 110; the center pin 120 disposed in the electrode assembly 110, having a longitudinal hole 122; a can 130 to house the electrode assembly 110 and an electrolyte (not illustrated); and a cap assembly 140 to seal an opening of the can 130.

The electrode assembly 110 includes a positive electrode plate 111, a negative electrode plate 112, and a separator 113 disposed therebetween. A positive electrode tab 114 extends from one side of the positive electrode plate 111, toward the cap assembly 140. The positive electrode plate 111 includes a positive electrode collector (not illustrated) that is coated with a positive electrode active material (not illustrated). A negative electrode tab 115 extends from the negative electrode plate 112, toward the bottom of the can 130. The negative electrode plate 112 includes a negative electrode collector (not illustrated) that is coated with a negative electrode active material (not illustrated). The locations of the positive electrode tab 114 and the negative electrode tab 115 can be reversed, and/or the polarities thereof can be reversed.

The positive electrode active material may include a lithium-containing transition metal oxide, such as $LiCoO_2$, $LiNiO_2$, $LiMn_2O_4$, or $LiNi_{1-x-y}Co_xM_yO_2$ ($0 \leq x \leq 1$, $1 \leq y \leq 1$, $0 \leq x+y \leq 1$, and M is a metal, e.g., Al, Sr, Mg, or La), or a lithium chalcogenide compound. The negative electrode active material may include a carbonaceous material, such as a crystalline carbon, an amorphous carbon, a carbon complex, or a carbon fiber, lithium metal, or a lithium alloy.

The positive or negative electrode collectors may be formed of one selected from the group consisting of stainless steel, nickel, copper, aluminum, and alloys thereof. In particular, the positive electrode collector is formed of aluminum or an aluminum alloy, and the negative electrode collector is formed of copper or a copper alloy, to maximize efficiency of the electrode assembly 110.

The separator 113 is disposed between the positive and negative electrode plates 111 and 112, to prevent a short circuit between the positive and negative electrode plates 111 and 112. The separator 113 is permeable to lithium ions. The separator 113 may be formed of a polyolefin-based polymer layer, for example, a polyethylene (PE), a polypropylene (PP), or a multiple layer thereof. The separator 113 may include a porous ceramic layer. Alternatively, the separator 113 may include both the polyolefin-based polymer layer and the porous ceramic layer. The ceramic layer may include one selected from the group consisting of silica ($SiO_2$), alumina ($Al_2O_3$), zirconium oxide ($ZrO_2$), titanium oxide ($TiO_2$), and an insulating nitride, hydrate, alkoxide, or ketonide, of silicon (Si), aluminum (Al), zirconium (Zr), or titanium (Ti).

Lithium ions, generated by an electrochemical reaction in the positive and negative electrode plates 111 and 112, travel through the electrolyte. The electrolyte may be a non-aqueous organic electrolyte, which is a mixture of a lithium salt and a high-purity organic solvent, or may be a polymer electrolyte.

The cap assembly 140 is coupled to the opening of the can 130, to seal the can 130. The cap assembly 140 includes: a cap-up that can be electrically connected with an external terminal (not illustrated); a safety vent 142 that is electrically connected with the positive electrode tab 114; a current interrupt device (CID) 143 disposed on the safety vent 142; and a gasket 141 to insulate the cap assembly 140 from the can 130. The safety vent 142 breaks or deforms to relieve an internal pressure of the battery 100, which results from gas generated during abnormal operations of the electrode assembly 140. The CID 142 is damaged or broken by the deformation of the safety vent 142, to interrupt an electrical connection between the electrode assembly 110 and the external terminal.

The cap assembly 140 may further include a ring-shaped positive temperature coefficient (PTC) thermistor 144, which is disposed between the CID 143 and the cap-up 145. The PCT thermistor 144 prevents an over current from occurring between the electrode assembly 110 and the external terminal.

The can 130 is cylindrical and houses the electrode assembly 110, the center pin 120, and the electrolyte. The can 130 may be formed of a light and flexible metallic material, such as aluminum, an aluminum alloy, or stainless steel. The can 130 serves as a negative electrode terminal, when the negative electrode tab 115 is electrically connected with the bottom surface of the can 130.

The can 130 may have a beading part (not illustrated) to seat the cap assembly 140 within the can 130. The can 130 can include a crimping part (not illustrated) that is bent around an outer surface of the cap-up 145, in order to prevent separation of the cap assembly 140 from the can 130.

The battery 100 includes an upper insulating plate 117 that is disposed on the electrode assembly 110. The upper insulating plate 117 has at least one hole, through which the generated gas can pass through. The battery 100 may include a lower insulating plate 116 disposed under the electrode assembly 110. The insulating plates 117 and 116 prevent short circuits between the electrode assembly 110 and the cap assembly 140, and between the electrode assembly 110 and the can 130, respectively. The lower insulating plate 116 may have a hole or groove 116a to secure one end of the center pin 120. The groove 116a may project toward the electrode assembly 110, to enlarge a contact surface with the center pin 120.

The center pin 120 is disposed in the electrode assembly 110 to prevent the deformation of the electrode assembly 110, during charging and/or discharging. The hole 122 in the center pin 120 is a passage through which the generated gas can pass through. The center pin 120 may be formed of a metallic material, such as a stainless steel (SUS), or an insulating material, such as a polybutylene terephthalate (PBT).

The hole 122 is shown to have a circular cross-section. However, in alternative embodiments the hole 122 may have a polygonal cross-section.

A sealing member 125 is disposed in the hole 122, to seal a portion of the hole 122, i.e., to adjust the unsealed volume of the center pin 120 and thereby optimize the void volume of the secondary battery 100. The sealing member 125 may be formed of the same material as the center pin 120, such as a polyethylene (PE), a polypropylene (PP), or a polybutylene terephthalate (PBT). The sealing member 125 can melt or dissolve at a high temperature, such that the hole 122 can serve as a passage for the gas. The melting point of the sealing member 125 can be lower than the melting point of the central pin 120. The sealing member 125 can include two or more walls that seal a portion of the hole 122, and thereby adjust the unsealed volume of the center pin 120.

Table 1 shows the probabilities of the degradation of insulating, charging, and high-temperature storage characteristics of the secondary battery 100, according to changes in the volume of the hole 122, due to the sealing member 125.

TABLE 1

| Unsealed Volume Reduction in Center Pin (%) | Unsealed Volume of Center Pin (mL) | Void Volume of Secondary Battery (mL) | Degradation of Insulating and Charging Characteristics (%) | Degradation of High-Temperature Storage Characteristics (%) |
| --- | --- | --- | --- | --- |
| 0 | 0.19 | 0.91 | 100 | 0 |
| 20 | 0.152 | 0.872 | 40 | 0 |
| 30 | 0.133 | 0.853 | 0 | 0 |
| 40 | 0.114 | 0.834 | 0 | 0 |
| 50 | 0.095 | 0.815 | 0 | 0 |
| 60 | 0.076 | 0.796 | 0 | 0 |
| 80 | 0.038 | 0.758 | 0 | 0 |
| 90 | 0.019 | 0.739 | 0 | 0 |
| 100 | 0 | 0.72 | 0 | 30 |

Referring to Table 1, when the void volume of the secondary battery 100 is greater than 0.853 mL, the insulating and charging characteristics of the secondary battery 100 are degraded. When the void volume of the secondary battery 100 is less than 0.739 mL, the high-temperature storage characteristics of the secondary battery 100 are degraded. As a result, to prevent the degradation of the insulating, charging, and high-temperature storage characteristics of the secondary battery, the unsealed volume of the center pin 120 is set to a volume ranging from 0.019 to 0.133 mL, so that the void volume of the secondary battery 100 (reduced by a sealed volume of the center pin) is set to a volume ranging from 0.739 to 0.853 mL.

Moreover, since the unsealed volume of the center pin 120 (volume of the unsealed portion of the hole 122 after adjustment by the sealing member 125) is adjusted to 30 to 90%, the unsealed volume of the center pin 120 ranges from 0.019 to 0.133 mL. Consequently, if void volume of the secondary battery 100 ranges from 0.739 to 0.853 mL. Thus, the void volume of the secondary battery 100 can be optimized, and the degradation of the insulating, charging, and high-temperature storage characteristics of the secondary battery 100 can be prevented, by adjusting the unsealed volume of the center pin 120.

Figure 3:
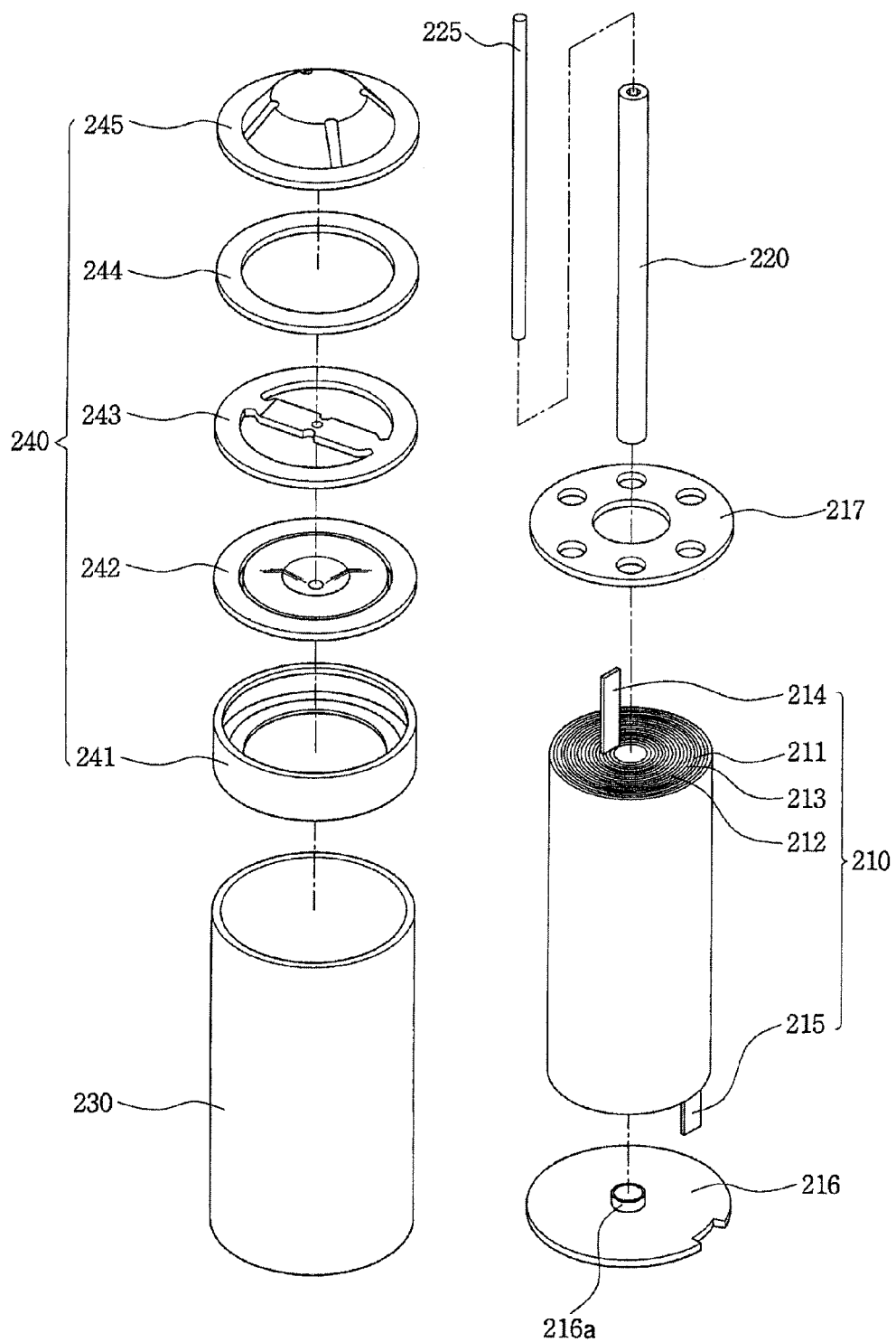
FIG. 3 is an exploded perspective view of a secondary battery, according to a second exemplary embodiment of the present invention.
Figure 4:
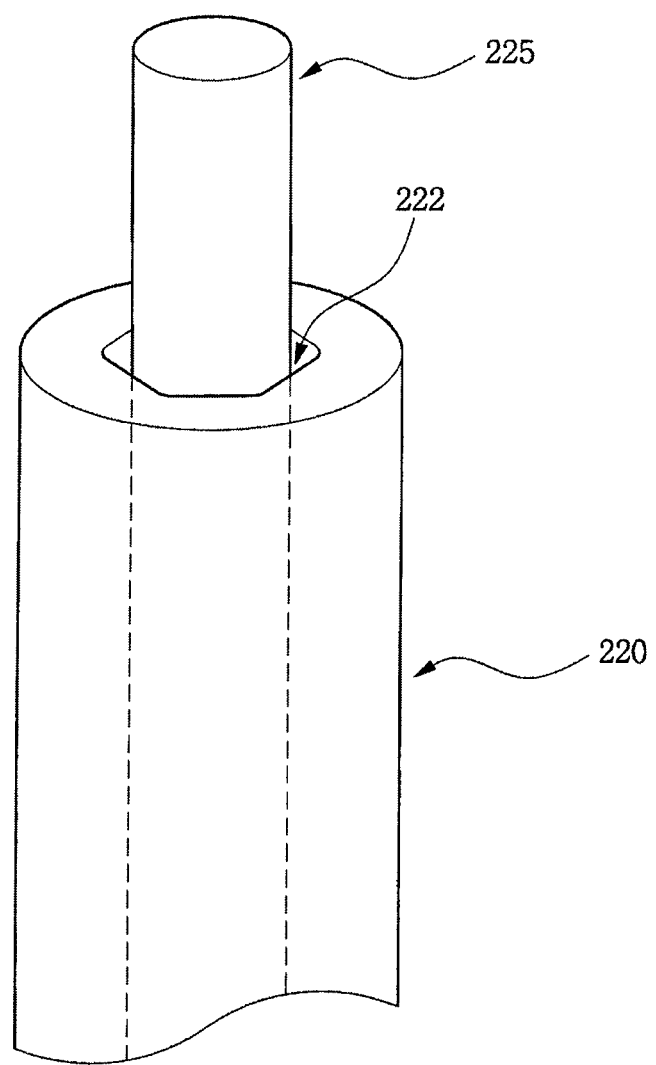
FIG. 4 is an exploded perspective view of a first center pin and a second center pin of the secondary battery, according to the second exemplary embodiment of the present invention.

FIG. 3 is an exploded perspective view of a secondary battery 200, according to a second exemplary embodiment of the present invention, and FIG. 4 is an exploded perspective view of a first center pin 220 and a second center pin 225 of the secondary battery 200. Referring to FIGS. 3 and 4, the secondary battery 200 includes: an electrode assembly 210; the first center pin 220, which is disposed in the electrode assembly 210; the second center pin 225, which is disposed in a longitudinal hole 222 of the first center pin 220; a can 230 to house the electrode assembly 210, the first center pin 220, the second center pin 225, and an electrolyte; and a cap assembly 240 to seal an opening of the can 230.

The electrode assembly 210 includes a positive electrode plate 211, a negative electrode plate 212, and a separator 213 disposed therebetween. The cap assembly 240 includes a cap-up 245, a PTC thermistor 244, a CID 243, a safety vent 242, and a gasket 241. The electrode assembly 210, the can 230 and the cap assembly 240 have the same configurations as those of the secondary battery 100, and thus, detailed descriptions thereof are omitted.

The first center pin 220 is disposed in the electrode assembly 210, to prevent deformation of the electrode assembly 210 during charging and/or discharging. The hole 222 of first center pin 220 is a passage through which a gas generated by the electrode assembly 210 can escape. The center pin 220 may be formed of a metallic material, such as a stainless steel (SUS), or an insulating material, such as PBT. The hole 222 may be circular or polygonal in cross-section.

The second center pin 225 is disposed in the hole 222, to adjust the inner volume of the first center pin 220 (inner volume of the hole 222). A diameter of the second center pin 225 may be smaller than that of the hole 222, so as to be easily inserted therein. While the cross-section of the second center pin 225 is circular in FIG. 4, in alternative embodiments, it may be polygonal, e.g., triangular or tetragonal. The shape of the second center pin 225 is different from the shape of the hole 222, such that gas can pass through the hole 222, even when the second center pin 225 is inserted therein.

Referring to Table 1, the void volume of the secondary battery 200 ranges from 0.739 to 0.853 mL, to prevent the degradation of the insulating, charging, and high-temperature storage characteristics of the secondary battery 200. The second center pin 225 reduces the inner volume of the first center pin 220, by 30 to 90%, such that the inner volume of the first center pin 220 (inner volume of the hole 222) ranges from 0.019 to 0.133 mL.

In the secondary battery 200, the second center pin 225 is inserted into the hole 222, thereby adjusting the inner volume of the hole 220 to be in the range of 0.19 to 0.133 mL and thereby adjusting the void volume of the secondary battery 200 to from 0.739 to 0.853 mL. Thus, the void volume of the secondary battery 200 is optimized, and degradation of the insulating, charging, and high-temperature storage characteristics of the secondary battery 200 is prevented.

In a center pin for a secondary battery and a secondary battery having the same, according to aspects of the present invention, even when a separator of an electrode assembly includes a porous ceramic layer, the secondary battery can have a void volume in a predetermined range, by adjusting the volume of a hole in a first center pin (inner volume of the center pin), using a sealing member to seal a portion of the hole, or by inserting a second center pin into the hole. Thus, a void volume of the secondary battery can be optimized, and the degradation of insulating, charging, and high-temperature storage characteristics of the secondary battery can be prevented, by adjusting the inner volume of the first center pin.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A center pin assembly for a secondary battery, comprising:
   a first center pin having a longitudinal hole; and
   a second center pin disposed in the hole, to reduce the inner volume of the hole, and defining a gap between the first and second center pins, the gap having a uniform cross-sectional area over an entire length of the second center pin.

2. The center pin assembly according to claim 1, wherein the second center pin reduces the inner volume of the hole by 30 to 90%.

3. The center pin assembly according to claim 1, wherein the inner volume of the hole ranges from 0.019 to 0.140 mL.

4. A secondary battery, comprising:
   an electrode assembly having a positive electrode plate, a negative electrode plate and a separator disposed between the positive and negative electrode plates;
   a first center pin disposed in the electrode assembly, having a longitudinal hole;
   a second center pin disposed in the hole, to adjust the inner volume of the hole, and defining a gap between the first and second center pins, the gap having a uniform cross-sectional area over an entire length of the second center pin;
   a can to house the electrode assembly; and
   a cap assembly to seal the can.

5. The secondary battery according to claim 4, wherein the second center pin reduces the inner volume of the hole by 30 to 90%.

6. The secondary battery according to claim 4, wherein the inner volume of the hole ranges from 0.019 to 0.140 mL.

7. The secondary battery according to claim 4, wherein the second center pin comprises a polymer resin.

8. The secondary battery according to claim 7, wherein the polymer resin comprises one selected from the group consisting of a polyethylene, a polypropylene, and a polyethylene terephthalate.

9. The secondary battery according to claim 4, wherein the separator comprises a porous ceramic layer.

10. The secondary battery according to claim 9, wherein the ceramic layer comprises one selected from the group consisting of: silica ($SiO_2$); alumina ($Al_2O_3$); zirconium oxide ($ZrO_2$); titanium oxide ($TiO_2$); and an insulating nitride, hydrate, alkoxide, or ketonide, of silicon (Si), aluminum (Al), zirconium (Zr), or titanium (Ti).

11. The secondary battery according to claim 9, wherein the separator further comprises a polyolefin-based resin layer.

12. The secondary battery according to claim 4, wherein a void volume of the secondary battery ranges from 0.739 to 0.853 mL.

13. The center pin according to claim 1, wherein the second center pin and the hole have differently shaped cross sections, such that the second center pin does not prevent a gas from flowing through the hole.

* * * * *